United States Patent [19]

Standifer

[11] Patent Number: 5,719,785
[45] Date of Patent: *Feb. 17, 1998

[54] DETECTION AND QUANTIFICATION OF FLUID LEAKS

[76] Inventor: Larry R. Standifer, 414 Rutherford Rd., Hurtsboro, Ala. 36860

[*] Notice: The term of this patent shall not extend beyond the expiration date of Pat. No. 5,575,136.

[21] Appl. No.: 658,212

[22] Filed: Jun. 4, 1996

Related U.S. Application Data

[63] Continuation-in-part of Ser. No. 243,916, May 17, 1994, Pat. No. 5,535,136.

[51] Int. Cl.⁶ ............................................. G01M 3/00
[52] U.S. Cl. ............................. 364/510; 73/40; 73/40.5 A; 73/40.5 R; 73/592; 364/509
[58] Field of Search ...................... 73/40, 40.5 R, 73/40.5 A, 592; 364/509, 510

[56] References Cited

U.S. PATENT DOCUMENTS

| | | | |
|---|---|---|---|
| Re. 33,977 | 6/1992 | Goodman et al. | 73/592 X |
| 3,500,676 | 3/1970 | Palmer | 73/40.5 A |
| 4,543,817 | 10/1985 | Sugiyama | 73/40.5 A |
| 4,584,654 | 4/1986 | Crane | 364/550 |
| 4,788,849 | 12/1988 | Yumoto et al. | 364/550 X |
| 4,898,022 | 2/1990 | Yumoto et al. | 73/592 X |
| 4,987,769 | 1/1991 | Peacock et al. | 73/592 X |
| 4,991,426 | 2/1991 | Evans | 73/592 X |
| 5,058,419 | 10/1991 | Nordstom et al. | 73/40.5 A |
| 5,099,437 | 3/1992 | Weber | 364/550 |
| 5,117,676 | 6/1992 | Chang | 73/592 X |
| 5,136,876 | 8/1992 | Taylor | 73/592 X |
| 5,206,818 | 4/1993 | Speranza | 364/550 |
| 5,361,636 | 11/1994 | Farstad et al. | 73/592 |
| 5,535,136 | 7/1996 | Standifer | 364/510 |
| 5,557,969 | 9/1996 | Jordan | 73/592 |

*Primary Examiner*—Edward R. Cosimano
*Attorney, Agent, or Firm*—Nies, Kurz, Bergert & Tamburro

[57] ABSTRACT

An apparatus and a method for quantifying the leak flow rate of a fluid from a fluid leak site in a piping system. An ultrasonic sound detector is used to accumulate sound level data for known leak sites in known piping system elements through which a known fluid flows at known temperatures and pressures. The accumulated data provide a database to permit the determination of fluid leakage rates in actual piping systems by comparing test data obtained for the actual piping system with the data contained in the database. In one embodiment of the invention, the database includes data corresponding to standard curves representing the relationship between accumulated sound level data and accumulated leak flow rate data. Based upon the cost of the fluid, the annual costs for fluid lost as a result of leakage can be determined, as well as the annual volume of fluid lost.

5 Claims, 8 Drawing Sheets

DETECTION AND QUANTIFICATION OF FLUID LEAKS

CROSS REFERENCE TO RELATED APPLICATIONS

This is a continuation-in-part application of application Ser. No. 08/243,916, filed May 17, 1994, now U.S. Pat. No. 5,535,136.

BACKGROUND OF THE INVENTION

1. Field of the Invention

This invention relates to the detection of fluid leaks and to a determination of the rate of fluid leakage from various and individual leak sites. More particularly, the present invention relates to a method and apparatus for detecting and determining the rate of flow of fluid leaks in a piping system having a variety of different piping system components.

2. Description of the Related Art

In industrial piping systems, fluid leaks are one of the main causes of system inefficiencies, resulting in wasted energy costs, environmental hazards, and increased manufacturing costs. Most distribution systems have been estimated to waste about 10–20% of their capacity to leakage, and it is not uncommon in large piping systems to have from 200–500 or more fluid leaks occurring simultaneously. The accumulative effects of these leaks can result in losses of hundreds of thousands of dollars per year and can result in needless capital expenditures for new or additional equipment installed to offset the effects of the leakage.

Past efforts to locate and quantify these leaks for repair scheduling have not been very successful. For example, industries formerly would take annual or bi-annual plant-wide "cold shutdowns" in order to make repairs or add new equipment. When the system was ready to be started up again, there would be a small period of time when leaks could be detected and repaired. This occurred because the fluid distribution systems were often one of the first systems brought back on line after shutdown and., while the other systems were not yet running, many leaks could be audibly located. However, this brief time period was often not enough to perform all the necessary repairs and generally only the large leaks were repaired if time allowed.

More recently, industry has adapted to obviate the need for complete shutdowns for repair and modification of equipment by taking more frequent but smaller sectional shutdowns, called "partial outages." While this allows the facility to continue operation and avoid start up expenses, it hinders even more the ability to accurately locate and quantify leaks because the leaks are more difficult to hear with part of the system running. This, in turn, hinders the ability to strategically plan partial shutdowns for leak repair while also making cost and environmental effect estimates difficult.

Nevertheless, because the leakage at most fluid leak sites emits sounds having components in the ultrasonic frequency range, an ultrasonic sound detector, as described, for example, in U.S. Pat. No. Re. 33,977, can provide an instrument to locate a leak site. The use of such an ultrasonic sound detector does not require facility shutdown, thus allowing for "on the run" leak detection.

However, one of the main problems with current ultrasonic leak detection methods is the inability to accurately compute the size and flow rate of a given leak once it has been detected. Some leak flow quantification methods only categorize the leak flow rate as "small", "medium", or "large". Others, such as that disclosed in U.S. Pat. No. 5,136,876, for example, determine an approximate leak flow rate by comparing the measured sound pressure level with a standard curve that plots gas leak rates versus sound pressure level without respect to the nature of the leak site. The inaccuracies resulting from such methods are generally due to failure to deal with variations in the size of the leak site, the influence of the configuration of the fluid system element at the leak site, variations in the properties associated with the type of fluid which is leaking, and variations in the system temperature and pressure of the fluid. Additionally, the qualitative "small-medium-large" categorization is wholly inadequate for determining dollar amount lost per year, possible environmental damage, and system maintenance and repair requirements.

It is thus one object of the present invention to provide a more accurate method for quantifying leak flow rates.

It is another object of the present invention to provide a more accurate method for detecting leak flow rates which can accurately estimate the yearly cost and volume loss of one individual leak or a system of leaks.

It is yet another object of the present invention to provide a method for creating a database which provides a more accurate representation of the rate of flow of fluid leaks.

It is another object of the present invention to provide a mobile apparatus which can more accurately determine leak flow rates.

SUMMARY OF THE INVENTION

One aspect of the present invention is a method for providing a database to be used in determining the size and leak rate of a fluid leak through an orifice in a distribution system. This is done by measuring low through high flow rates of a simulated fluid leak through an orifice, by using a sound detector to measure the sound pressure level corresponding to each of the low through high flow rates and by attenuating the sound pressure level to a desired level. Then, the equivalent orifice areas corresponding to the low through high flow rates of the simulated fluid leak are determined and the obtained data, including appropriate sound detector measurements, are recorded in a database. In one embodiment of the invention, the flow rate and attenuated sound detector measurements are plotted on a curve and the data corresponding to the estimated mathematical relationship between the flow rate and the attenuated sound detector measurements as described by the curve are recorded in a database.

Another aspect of the present invention is a method and apparatus for determining the size and leak rate at a fluid leak site by measuring the sound pressure level of the fluid leak, attenuating the sound pressure level measurement to a known level, comparing the attenuation setting to a predetermined standard for fluid leak areas, and computing the leak rate from the obtained leak area. In one embodiment of the invention, the attenuation setting measurement is compared directly to a predetermined standard for leak flow rates.

DETAILED DESCRIPTION OF THE PREFERRED EMBODIMENTS

Figure 1:
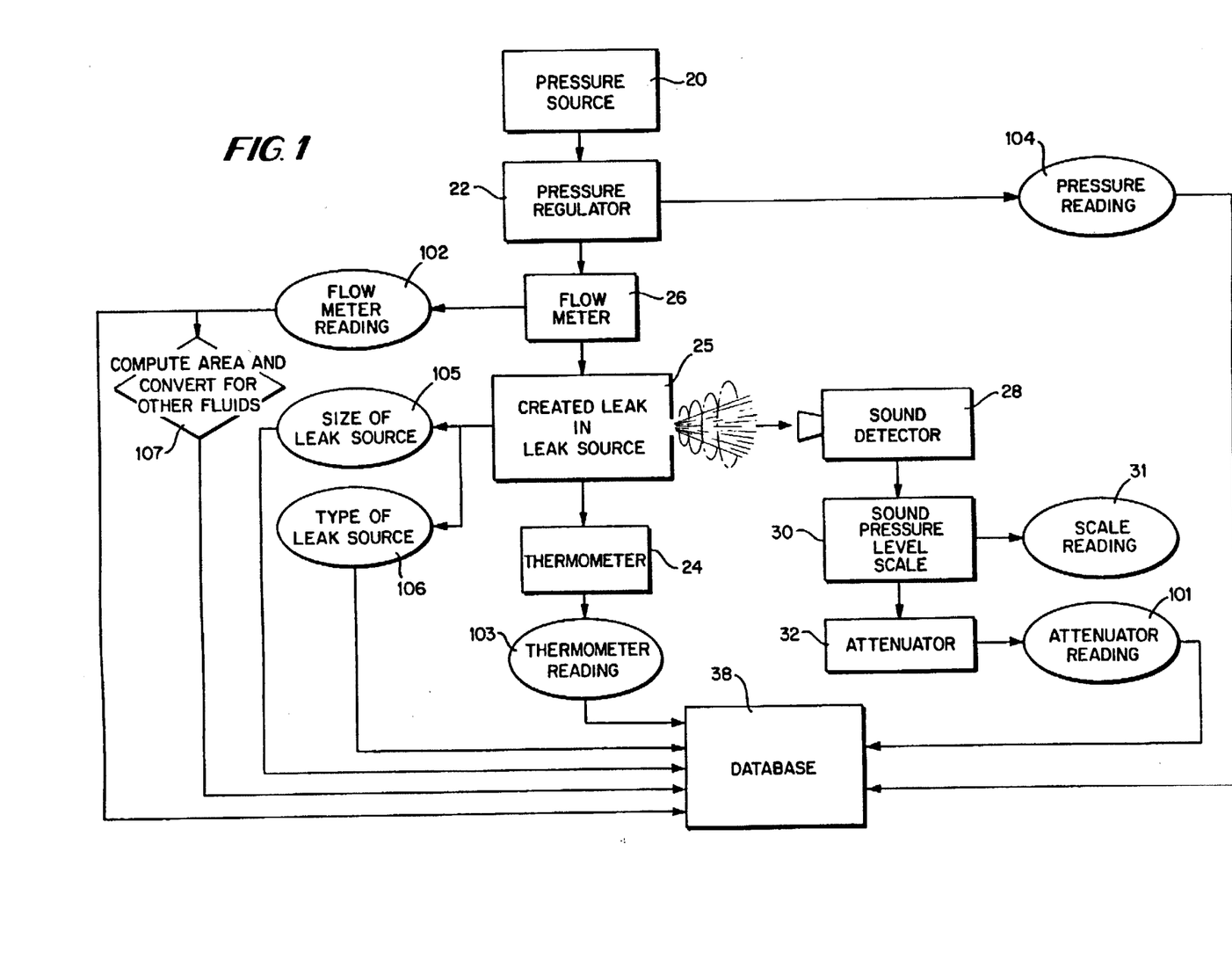
FIG. 1 is an overall block diagram showing several steps of a method of providing a fluid leakage rate database in accordance with the present invention.

FIG. 1 represents a block diagram showing the several steps of a method of providing actual leakage site and leakage flow rate data for a plurality of leakage sites and leakage flow rates to provide the information to prepare a database for more accurately measuring leakage rates in accordance with the present invention. Starting with any potential leak source, such as a pipe of given size and joint configuration, a source 20 of pressurized fluid, such as an air compressor, is connected with a known leak source having a known structure, through a pressure regulator 22 to provide compressed fluid such as air at a predetermined pressure and temperature through a created leak 25 (see also FIG. 2) in the known leak source. The flow rate of the air through the system or the leak site is measured by a suitable flow meter 26. The pressure is determined by pressure regulator 22 and the temperature by a suitable thermometer 24. The flow meter 26 can be any conventional flow meter capable of measuring air flow, such as, for example, Pneumatic Flow Meter Models G-32201-00, G-32201-21, or G-03228-91, manufactured by Headland Mfg., Racine, Wis.

The flow meter 26 may, for example, use the well-known sharp edge orifice method for measuring the flow rate of a fluid through an orifice.

Low through high leakage flow rates are simulated by changing the flow area at the leak site 25, such as by physically enlarging the leak site area. The object is to simulate the flow rates which still provide a detectable sound pressure level reading on the ultrasonic sound detector. Leak flow rates which do not provide such a reading are not relevant for the present invention because they generally occur in the audible frequency range and are readily detected without the need for instruments and therefore are usually repaired immediately. The ultrasonic sound detector 28 is used in conjunction with the flow meter 26 to set the appropriate area at the leak site 25 to use in obtaining the low through high flow rates.

Figure 5:
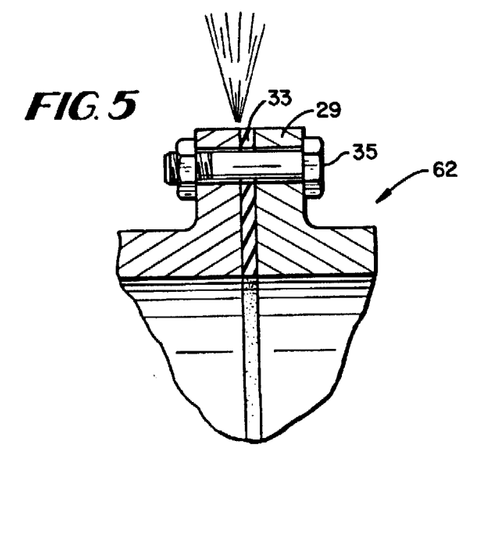
FIG. 5 is a fragmentary side elevational view, in cross section, showing a typical flange joint with a common leak site.
Figure 6:
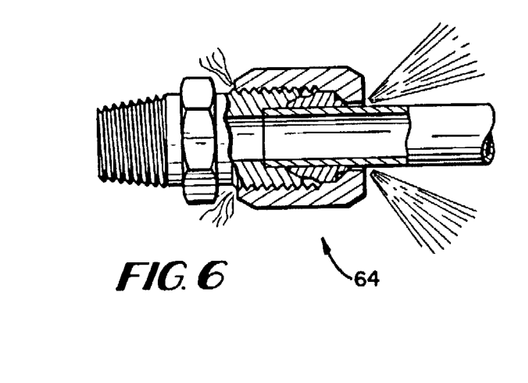
FIG. 6 is a fragmentary side elevational view, in cross section, showing a typical tube and tube end fitting joint with common leak sites.
Figure 7:
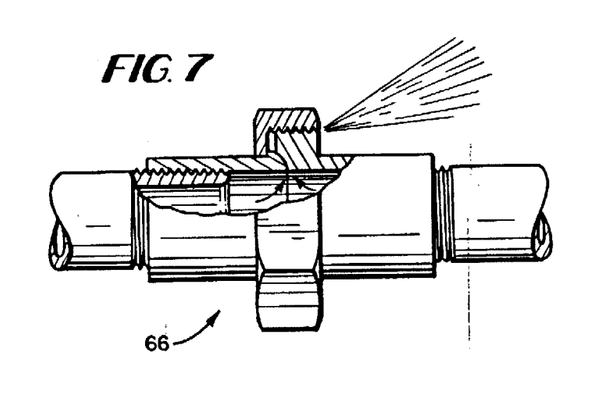
FIG. 7 is a fragmentary side elevational view, in cross section, showing a typical pipe union fitting with a common leak site.
Figure 8:
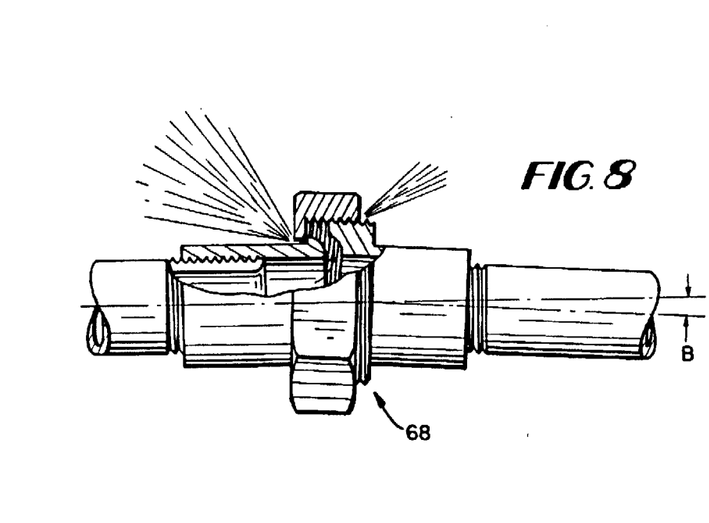
FIG. 8 is a view similar to FIG. 7 showing a misaligned pipe union fitting, with common leak sites.
Figure 9:
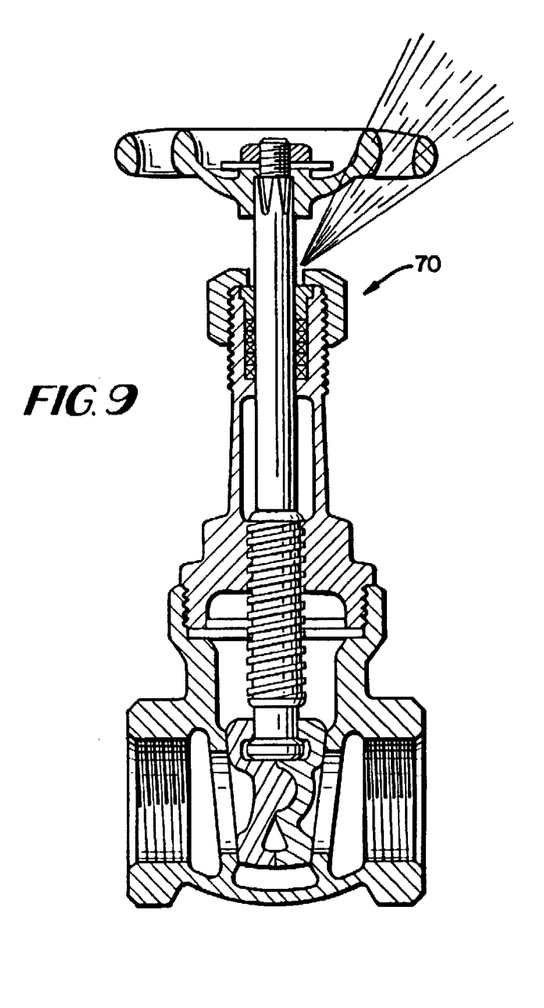
FIG. 9 is a side elevational view, in cross section, showing a typical gate valve with a common leak site.

As an example, in determining the high leakage flow rate level to be simulated in a flange joint 29 as shown in FIG. 5, the retaining bolt 35 is incrementally loosened while the flow rate and sound pressure level are measured at each increment. When the gasket 33 no longer makes full contact with one side of the flange 29 or when the flange connection is disconnected altogether, the resulting leak does not provide a useful high flow rate for the database of the present invention because such a leak would not require ultrasonic sound detection. Rather, this type of leak, similar to a blown gasket leak, would be readily audibly or visually noticeable and the flange joint 29 would then be quickly repaired or tightened. Thus, the increment tested immediately prior to this unhelpful increment is used as the appropriate size leak for measuring the high flow rate because it represents the highest flow rate for the simulated leak which provides a readable ultrasonic sound pressure level measurement. Similarly, the low leakage flow rate level for a flange joint 29, for example, is simulated by creating as small a leak site area as possible, such as by tightening retaining bolt 35, to provide a leakage area which will still provide a readable sound pressure level measurement on the ultrasonic sound detector, and then measuring the flow rate for that leakage area.

Figures 2, 4:
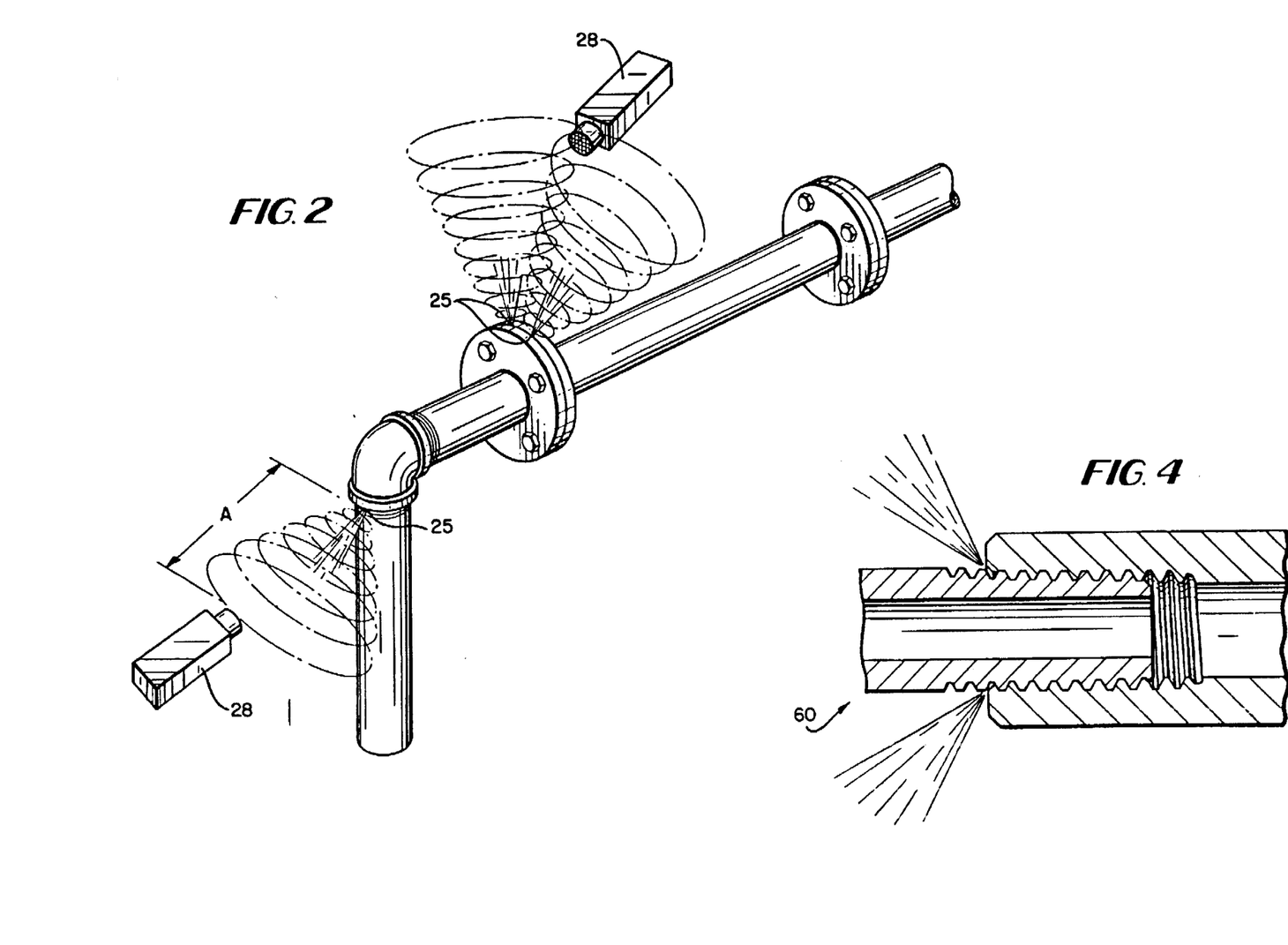
FIG. 2 is a fragmentary perspective view of fluid leak sites in a portion of a piping system and an ultrasonic sound detector for measuring sound pressure levels in accordance with the present invention.
FIG. 4 is a fragmentary side elevational view, in cross section, showing a typical screw-type pipe joint with common leak sites.

In measuring the sound pressure level of the fluid escaping through the leak site 25 as shown in FIG. 2, the ultrasonic sound detector 28 is maintained at a predetermined distance "A" from the leak site at the potential leak source, i.e., the pipe joint undergoing testing. The distance "A" can be six inches or twelve inches, for example, and the sound pressure level reading is taken at the maximum sound pressure value, determined by moving detector 28 around the leak site, at the predetermined distance, until the maximum reading is obtained.

An ultrasonic sound detector 28 suitable for use in the present invention can be any conventional ultrasonic sound level meter, preferably one having an attenuation dial 32 for regulating the sensitivity with which the sound detector receives sound signals. One type of ultrasonic sound detector 28 that has been found to be suitable is a portable, hand held self-contained ultrasonic transducer assembly/transmission unit, commercially available as Model 2000 from U.E. Systems, Inc., Elmsford, N.Y. The detector 28 senses the sound pressure level or amplitude of the sound produced by a leak, in the desired frequency range, which can be the ultrasonic frequency range (20–100 KHz), and indicates this sound pressure level by an indicator needle 31 that is movable across a scale 30 which can be converted to decibels, if desired. It is important that the sound detector 28 is maintained at substantially the same distance from each simulated leak site 25 for uniformity purposes and for subsequent correlation of actual detected sound level data with the previously acquired sound level data at the simulated leak sites.

Figure 3A:
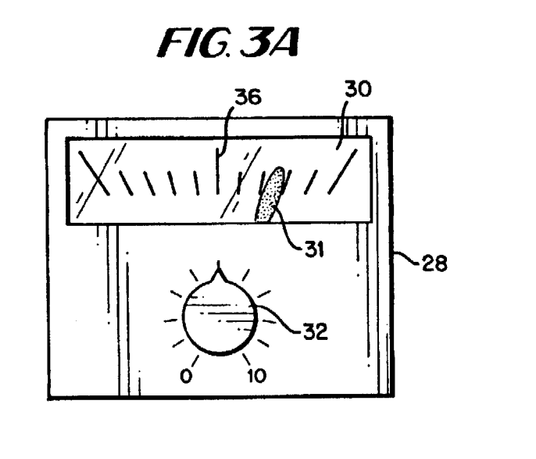
FIG. 3a shows a front view of one form of sound pressure level meter and attenuation dial as found on an ultrasonic sound detector showing a high sound pressure level reading.
Figure 3B:
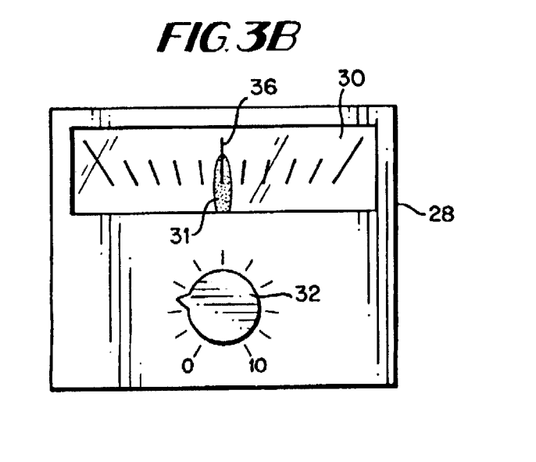
FIG. 3b shows the ultrasonic sound detector dial and meter of FIG. 3a with the attenuation dial turned down so as to bring the meter level reading to a desired level.
Figure 3C:
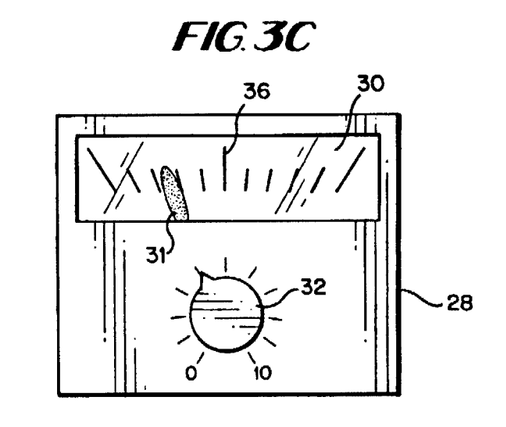
FIG. 3c shows a front view of the sound pressure level meter and attenuation dial of FIG. 3a showing a low sound pressure level reading.
Figure 3D:
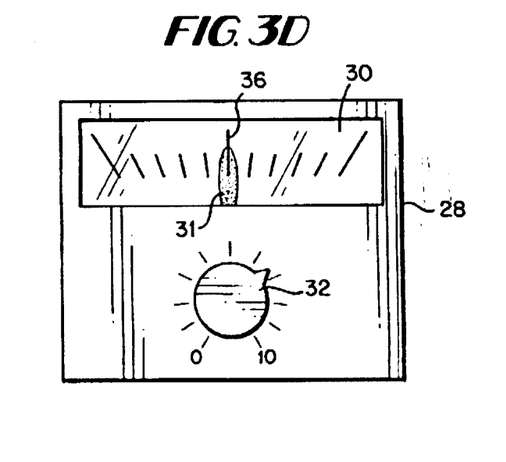
FIG. 3d shows the ultrasonic sound detector dial and meter of FIG. 3a with the attenuation dial turned up so as to bring the meter level reading to the desired level for taking a reading.

As shown in FIGS. 3a through 3d, once the sound pressure level is indicated by the indicator needle 31 that is movable across the sound detector scale 30, the sensitivity level of the sound detector 28 is adjusted by turning the attenuation dial 32 to bring the indicator needle 31 to a convenient position, such as the midpoint 36 of scale 30. This position corresponds to a value of 50.00 on the scale of the U.E. Systems sound detector identified above. The setting of attenuation dial 32 can range from 0 to 10. Thus, the higher the intensity level of the sound signal being emitted from the intentionally created leak 25, the greater attenuation or signal weakening that will be required to achieve the midpoint 36 on the scale 30 of the ultrasonic sound detector 28, and thus the lower the setting of attenuation dial 32, as shown in FIGS. 3a and 3b. A weaker sound pressure level, such as shown in FIG. 3c, requires a correspondingly higher setting of attenuation dial 32, as shown in FIG. 3d, for indicator needle 31 to reach the desired position relative to scale 30. The setting 101 of attenuation dial 32 is then recorded as a data point in the database 38, along with its corresponding leakage flow rate 102 measured by the flow meter 26 and the values for fluid temperature 103, fluid pressure 104, properties associated with the fluid type (e.g. density, viscosity, gas pressure, etc.), pipe diameter size 105 and category 106 of piping system element. Examples of the categories of piping system elements for which data can be obtained are flanged joints, unions, gate valves, tube fitting joints, and the like, depending upon the piping elements that are included in the systems to be tested for leakage rates. Examples of the fluid type for which data can be obtained include liquids which flash into gases upon exiting the piping system and gases such as air, nitrogen, natural gas, and the like, depending upon the fluid types included in the systems to be tested for leakage rates.

Thus, the attenuation dial setting is simply the level of sensitivity to which the sound detector 28 must be set in order to receive a sound signal from the created leak 25 at a sound pressure level at the midpoint 36 of the sound detector scale 30. This attenuation dial setting is important because the actual piping system survey data will have its own attenuation dial setting and, by comparison with the simulated data, the flow rate and area of actual survey leaks can be computed as will be explained hereinafter.

Table 1 is an example of a compilation of fluid leakage data for one size of one type of pipe, at a given temperature and at different fluid pressures and leakage flow rates. For this example, as shown in Table 1, the fluid type is air, the temperature is 78 degrees F., and the pipe is a 0.5 inch screw joint. As the fluid supply pressure is incrementally varied by adjusting a pressure regulator 22 on the pressure source 20, values for leak rates and sensitivity readings are obtained and recorded in tables as shown in Tables 1a and 1b. As shown in Table 1c, corresponding values for equivalent orifice areas are calculated in a manner to be described later and are then recorded to complete the table. Each table is then recorded in the database 38.

TABLE 1

FLUID TYPE: AIR AT 78° F.
0.5 inch Screw Joint

FLOW RATE (SCFM'S)

| Press PSIG | F.LO | F1 | F2 | F3 | F4 | F5 | F6 | F7 | F.HI |
|---|---|---|---|---|---|---|---|---|---|
| 20 | 0.016 | 0.02 | 0.18 | 0.25 | 0.40 | 0.55 | 0.70 | 0.86 | 1.01 |
| 30 | 0.016 | 0.03 | 0.18 | 0.25 | 0.44 | 0.87 | 1.00 | 1.12 | 1.25 |
| 40 | 0.016 | 0.03 | 0.20 | 0.30 | 0.44 | 0.77 | 0.88 | 0.99 | 1.10 |
| 50 | 0.018 | 0.05 | 0.22 | 0.33 | 0.50 | 0.80 | 0.95 | 1.10 | 1.25 |
| 60 | 0.016 | 0.08 | 0.25 | 0.33 | 0.53 | 0.77 | 1.03 | 1.25 | 2.00 |
| 80 | 0.021 | 0.11 | 0.50 | 0.63 | 1.06 | 1.50 | 2.00 | 3.50 | 4.00 |
| 100 | 0.016 | 0.15 | 0.45 | 0.61 | 1.16 | 1.25 | 2.00 | 5.00 | 6.00 |

DIAL SENSITIVITY READING (at 6 inches)

| Press PSIG | S.LO | S1 | S2 | S3 | S4 | S5 | S6 | S7 | S.HI |
|---|---|---|---|---|---|---|---|---|---|
| 20 | 8.58 | 7.44 | 6.40 | 6.17 | 6.04 | 5.89 | 5.75 | 5.60 | 5.46 |
| 30 | 8.30 | 7.14 | 6.38 | 5.83 | 5.68 | 5.56 | 5.45 | 5.33 | 5.22 |
| 40 | 8.28 | 7.13 | 6.38 | 5.83 | 5.69 | 5.56 | 5.44 | 5.32 | 5.20 |
| 50 | 8.19 | 6.95 | 6.10 | 5.47 | 5.23 | 5.41 | 5.60 | 5.78 | 5.97 |
| 60 | 8.05 | 6.65 | 6.02 | 5.81 | 5.45 | 5.12 | 4.96 | 5.00 | 4.62 |
| 80 | 8.10 | 6.64 | 5.50 | 4.73 | 4.56 | 4.38 | 4.28 | 3.25 | 2.78 |
| 100 | 8.30 | 6.20 | 6.15 | 5.47 | 5.34 | 4.63 | 5.20 | 3.50 | 2.94 |

AREA (SQ. FT.)

| Press PSIG | A.LO | A1 | A2 | A3 | A4 | A5 | A6 | A7 | A.HI |
|---|---|---|---|---|---|---|---|---|---|
| 20 | .00026 | .00035 | .00045 | .00054 | .00064 | .00088 | .00112 | .00137 | .00026 |
| 30 | .00019 | .00035 | .00052 | .00069 | .00086 | .00100 | .00115 | .00129 | .00144 |
| 40 | .00014 | .00025 | .00037 | .00047 | .00059 | .00069 | .00079 | .00089 | .00099 |
| 50 | .00013 | .00022 | .00031 | .00040 | .00049 | .00059 | .00070 | .00081 | .00092 |
| 60 | .00010 | .00023 | .00031 | .00063 | .00063 | .00110 | .00157 | .00205 | .00252 |

TABLE 1-continued

FLUID TYPE: AIR AT 78° F.
0.5 inch Screw Joint

| 80  | .00010 | .00019 | .00024 | .00051 | .00051 | .00072 | .00097 | .00169 | .00194 |
| 100 | .00006 | .00013 | .00031 | .00045 | .00045 | .00049 | .00078 | .00197 | .00236 |

The low through high equivalent orifice areas corresponding to the low through high leak flow rates are computed by the standard formula for flow of compressible fluids through nozzles; and orifices, $$q = YCA \sqrt{[2g(144)\Delta P/\rho]}$$

where q=flow rate, cubic feet per second at flowing conditions,

Y=a constant related to the net expansion factor for compressible flow through a sharp-edged orifice, C=a constant related to the flow coefficient for a sharp-edged orifice, A=cross sectional area of orifice, square feet, g=acceleration of gravity, 32.2 feet per second squared, P=pressure differential between fluid within the pipe system and the atmospheric pressure, psig, ρ=gas weight density, pounds per cubic foot, which can be represented from the ideal gas equation as P/RT, where P=absolute gas pressure, psia, R=individual gas constant, foot pounds per lb per degree Rankine, T=gas temperature, degrees Rankine=degrees F.+460.

Although Y and C are considered for practical purposes to be constant, Y varies slightly based upon the pressure ratio across the orifice, and C varies slightly based upon the Reynolds number. Since pressure ratios are generally high, Y can range from about 0.75 to about 0.83; orifice coefficients, C, can range from about 0.6 to about 1.0, depending on the Reynolds number. Using the lower values for each of Y and C, for simplicity of computation, yields more conservative results. The flow rate equation is solved for the calculated leakage areas corresponding with the test data under the various test conditions recorded in the tables of data. These calculated areas are called equivalent orifice areas because the flow meter 26 is designed to measure the flow rate of a fluid through an orifice. Since the leaks 25 created to obtain the database in accordance with the present invention emanate from leak sites of unknown size, using the measured flow rates and related data in the equation above enables the calculation of the equivalent orifice areas which correspond to each of the measured leakage flow rates under the given conditions. Thus, Table 1 is an example of data collected for a screw joint having a pipe size of 0.50 inches, for air at a given temperature of 78 degrees F., and over a range of fluid supply pressures.

Once a sufficient number of data points have been established and recorded, the fluid supply temperature is varied to different levels while keeping all other factors the same, and the leakage areas are again calculated based on measured leakage flow rates. These flow rate values and leakage area values are recorded with their corresponding sensitivity readings in another table in the database 38.

In one embodiment of the invention, fluid supply temperatures between 70 and 110 degrees F. and pressures between 20 and 100 psig were provided, with the low through high leakage flow rates, to obtain low through high area parameters 107 (see Table 1c and FIG. 1) for each pipe size and joint type at the various fluid supply temperatures and pressures. The database 38 can be supplemented by calculated leakage area values 107 for selected temperatures and pressures greater than the actual measured temperature and pressure values. The database 38 can also be supplemented by calculated leakage area values 107 for selected fluids based on their unique properties. The fluids used in this invention include liquids which flash into a gas upon exiting the piping system as well as gases such as air, helium, argon, carbon dioxide, nitrogen, natural gas, hydrogen, oxygen, and steam.

The same data accumulation process is continued until each individual pipe size and joint type has been tested at the varying conditions. Once all data points are gathered for a range of pipe sizes of the given joint type, such as from 0.5 inch to 3 inches, the next joint type is tested according to the same procedures just described. The joint types tested in this invention, as shown in FIGS. 4 through 10, include: 1) screw joints 60 (FIG. 4), ranging from an inside diameter of 0.125 inch through three inches N.P.T. (National Pipe Thread), including 90 degree elbows, 45 degree elbows, couplings, male adapters, etc., 2) flange joints 62 (FIG. 5), ranging from 0.5 inch to 3 inches inside diameter, 3) tube fittings 64 (FIG. 6), ranging from 0.125 inch to 0.5 inch in outside diameter, 4) union fittings 66 (FIG. 7), ranging from 0.25 inch to 2.5 inches inside diameter, 5) misaligned unions 68 (FIG. 8) with varying degrees "B" of external force or misalignment, 6) valve packing 70 (FIG. 9), in which the valve stem inside diameter ranges from 0.25 inch to 0.5 inch, and 7) area or bore diameter type leaks 74 (FIG. 10) not located at the other types of connection points that were tested. In general, larger sizes of these configurations are not often found in industry. However, their flow rates tend to correspond relatively closely with the flow rates of the largest sizes tested as identified above.

Figure 10:
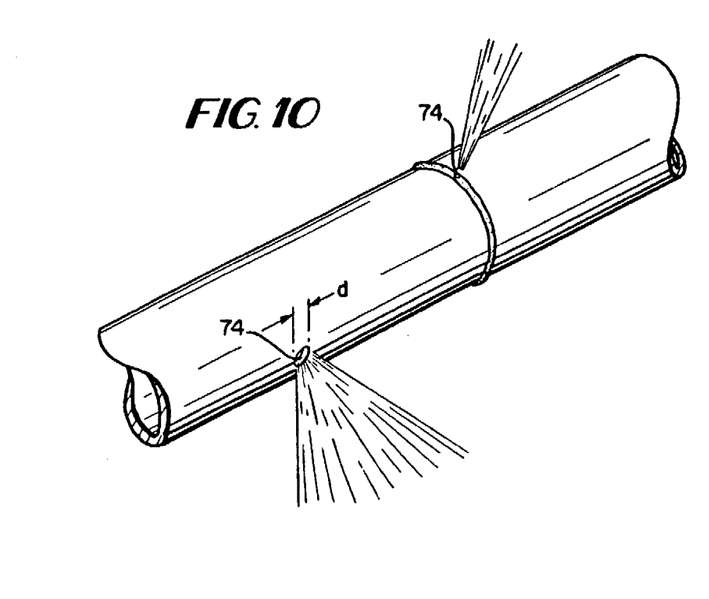
FIG. 10 is a fragmentary perspective view of a welded pipe joint showing common joint and bore hole leak sites.

For "area" 74 category leaks (see FIG. 10), the attenuation dial settings need not be taken. This is because the cross-sectional areas of these leaks may be obtained using the formula $$\pi d^2/4$$

where d is the measured or estimated bore or hole 74 diameter.

The assembled database 38 therefore includes a series of tables of data, such as Table 1, containing a plurality of empirically determined data points, allowing one to determine with a higher degree of accuracy than heretofore possible the ranges of the leak area and leakage flow rate for a given fluid, at a given temperature and given pressure, traveling through a specified piping joint configuration of a given size. The data constituting database 38 can be stored in a database-type computer program for later access. In one embodiment of the invention, the data are compiled and organized in a commercially available computer database program such as Microsoft Access, version 1.1, available from Microsoft Corp., Redmond, Wash.

In one embodiment of the invention, the data used to create each table is used to plot the obtained sensitivity values against the obtained leak rate values on a graph. A curve is then generated to fit the plotted points based on a mathematical curve estimation method. The curve and the formula describing the curve can then be stored in the database with corresponding parameters of fluid type, temperature, pressure, pipe size and pipe configuration. The curve estimation method provides a more accurate way to determine the leak rate of a given leak based on an obtained sensitivity reading.

Figure 13:
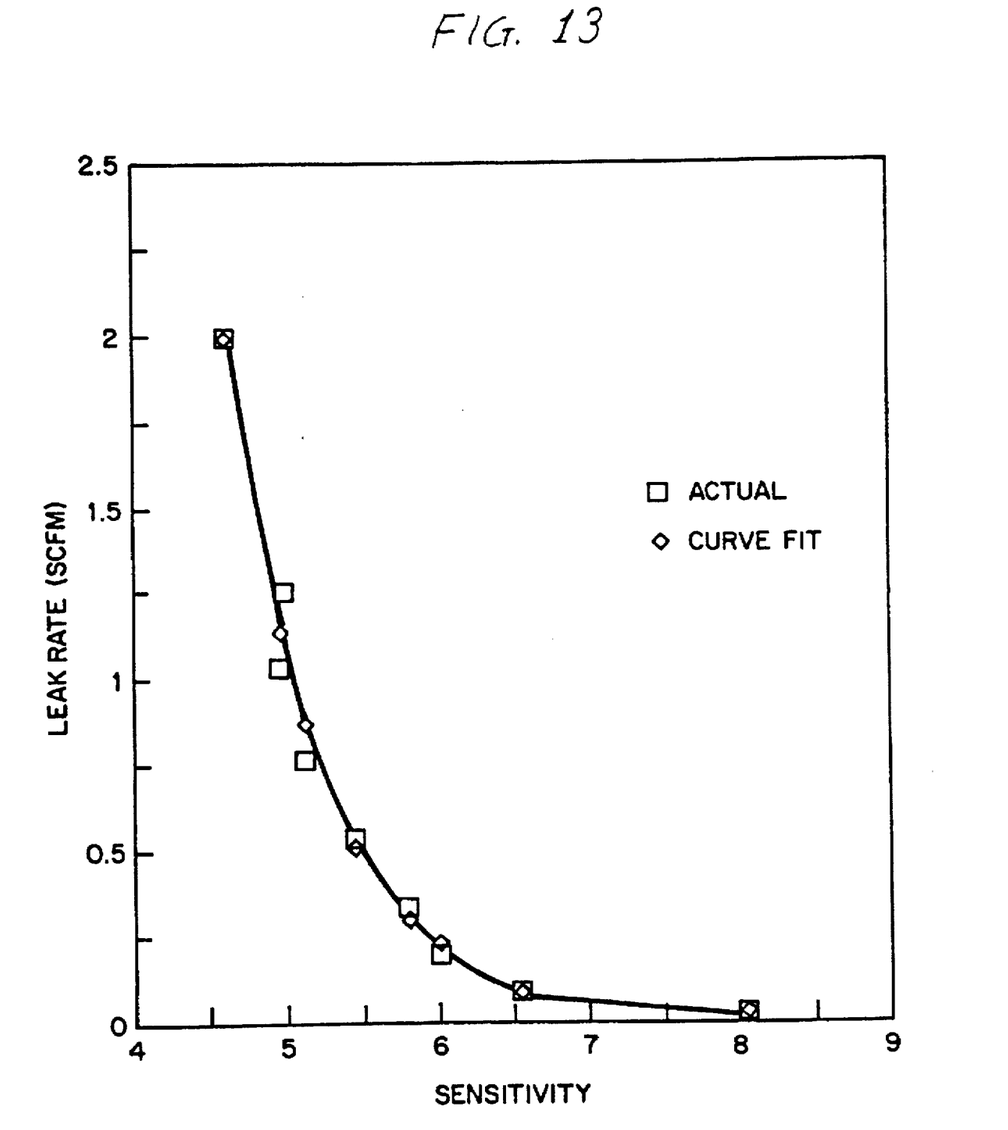
FIG. 13 is a sample curve plotting air leak rates versus sound detector sensitivity readings for a given pipe size and configuration at a given pressure and given temperature.

For example, FIG. 13 shows a sample curve based on air leakage data recorded for a 0.50 inch screw pipe at 60 psig and at 78 degrees F. The actual empirically derived leak rate and sensitivity values are plotted and then a curve is fitted to the plotted points using a mathematical curve fitting method. In one embodiment of the invention, the method of least squares is employed as the formula for describing the empirically determined data points. The method of least squares assumes that the formula is of the form:

$$y = C_0 + C_1 x + C_2 x^2 + C_3 x^3 + \ldots + C_n x^n$$

where $C_n$ = constant coefficients n = order of the polynomial y = leak rate and x = sensitivity reading The formula may be solved using the empirically derived leak rate and sensitivity values to obtain values for the constant coefficients. The number of constant coefficients solved for depends upon the order of the polynomial. For example, a third order polynomial will have four constant coefficients, $C_0$, $C_1$, $C_2$, and $C_3$. A fourth order polynomial will have five constant coefficients, $C_0$, $C_1$, $C_2$, $C_3$, and $C_4$. Increasing the number of constant coefficients solved for can increase the accuracy of the leak rate determination.

Thus, in this embodiment of the invention wherein a curve estimation formula is used to estimate the curvilinear relationship between the empirically derived leak rate and sensitivity values, the database may include constant coefficients corresponding to a given fluid at a given temperature and pressure, for a specified piping joint configuration of a given size. Tables 2 and 3 are examples of constant coefficient tables for a third and a fourth order polynomial, respectively, for the conditions associated with FIG. 13.

TABLE 2

| Air at 78 degrees F. and 60 psig 0.50 inch Screw Joint | | | |
|---|---|---|---|
| $C_0$ | $C_1$ | $C_2$ | $C_3$ |
| 59.23202 | −26.1459 | 3.838835 | −0.18693 |

TABLE 3

| Air at 78 degrees F. and 60 psig o.50 inch Screw Joint | | | | |
|---|---|---|---|---|
| $C_0$ | $C_1$ | $C_2$ | $C_3$ | $C_4$ |
| 195.8236 | −118.759 | 27.10186 | −2.75053 | 0.104486 |

In one embodiment of the invention, only a formula and coefficient values for each given set of system parameters are stored in the database, thereby greatly simplifying the database. Other curve fitting formulas may be employed besides the method of least squares.

Figure 11:
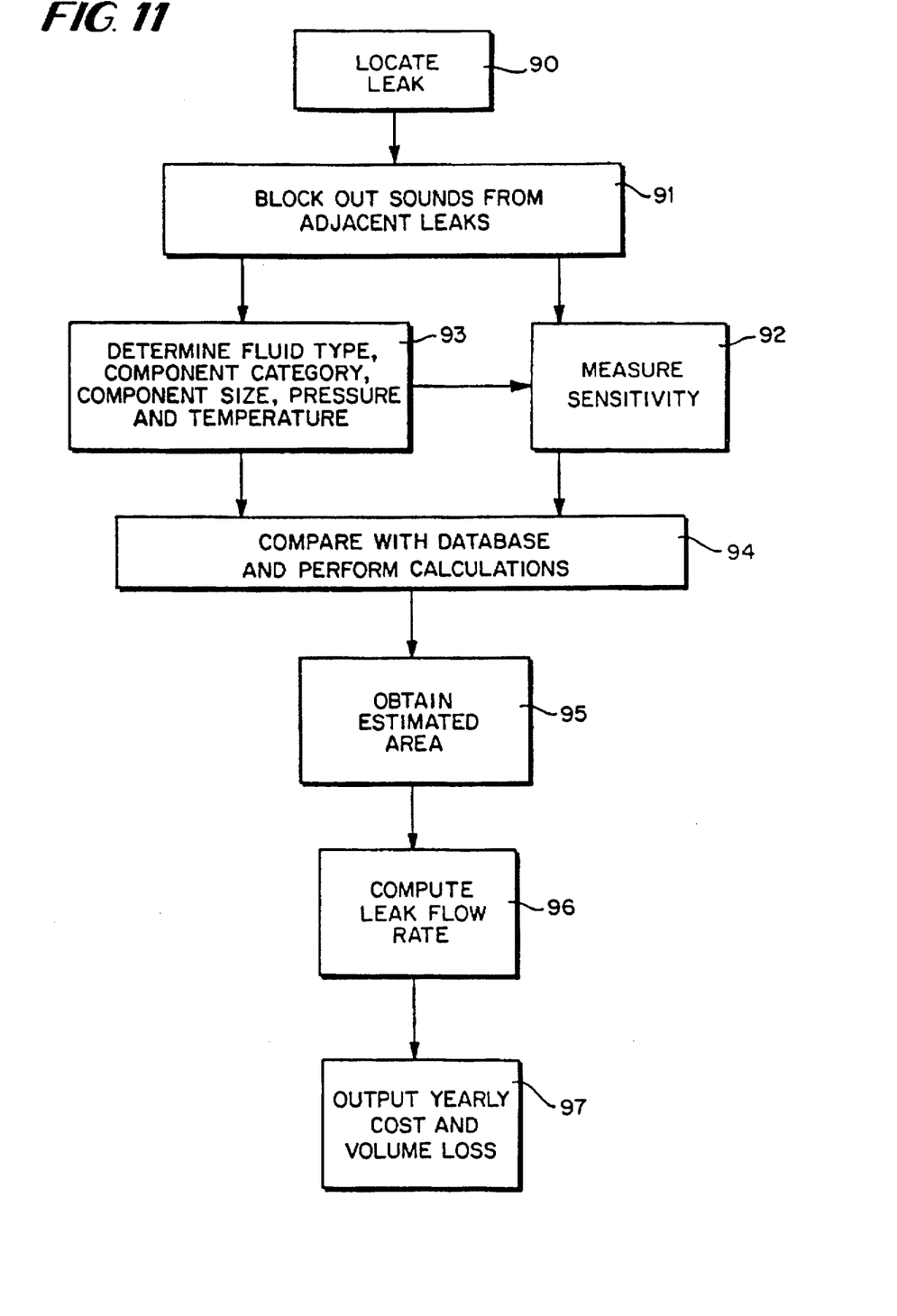
FIG. 11 is a block diagram showing several steps of a method of determining leak flow rates and leakage costs for a single leak site.
Figure 12:
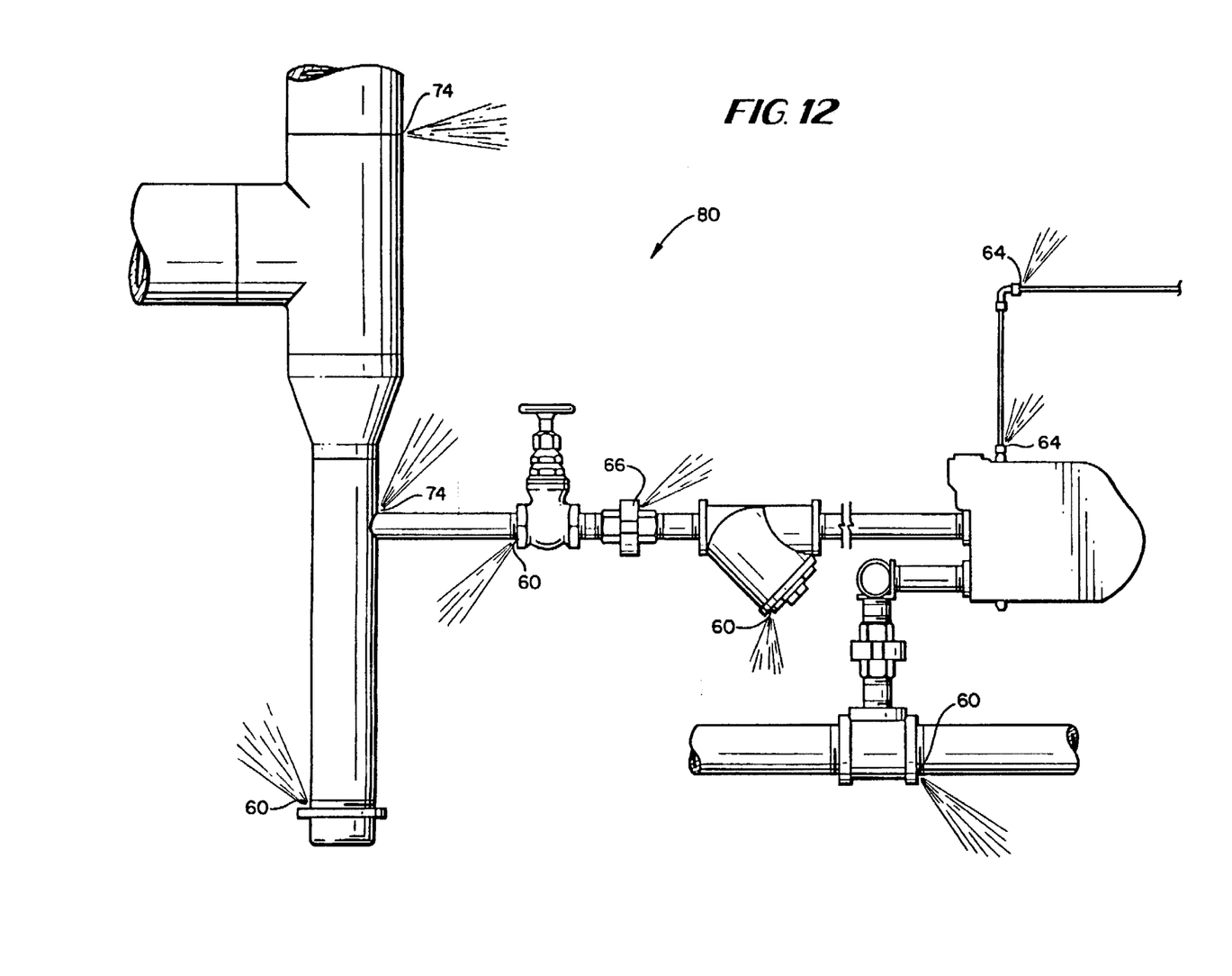
FIG. 12 is a fragmentary view of a portion of a piping system having several fluid leaks that can be detected and measured using a method and apparatus in accordance with the present invention.

After the database 38 has been assembled, the leak rate determination for leak sites in actual piping systems can be made by following the method steps shown in FIG. 11, which is a block diagram showing a method for determining the rate of flow of fluid from a leak site detected in an actual field survey in an actual piping system 80, such as that shown in FIG. 12. In addition to recording certain piping system descriptive data that are useful for later identification purposes, such as the date and location of the field survey, the client, and the like, the key input variables that must be determined for use with the established database 38 include the category and size of the piping component, the type of fluid in the piping system and the properties associated therewith, the pressure and temperature of the fluid within the system, and, most importantly, the sensitivity reading as read from the attenuation dial 32 on the ultrasonic sound detector 28. The attenuation dial reading is the reading that corresponds with a midpoint sound pressure level 36 on indicator scale 30 when the sound detector is placed at the predetermined distance "A" from the leak site and at the position relative to the leak site to provide the highest sound intensity level reading. The remaining leak sites are blocked off from the detector, such as by an enclosure or shroud, to minimize the effect of spurious sound signals not associated with the leak site being tested. The type of fluid within the system and its corresponding properties are known, the category of piping component can be determined by visual inspection, and the size of piping component can be determined by simple measurement. The pressure of the fluid can be measured by a suitable pressure gauge and the temperature can be measured by a suitable temperature gauge. Additionally, if the fluid involved is steam, the computer database is programmed to automatically provide the temperature of saturated steam associated with the entered pressure value to simplify computations by eliminating the additional variable of superheated steam temperature. Thus, if the temperature entered by the user is mistakenly less than the saturation temperature, the fluid is actually water and not steam, and unless properly programmed, the database will yield an error message for inaccurate results.

The flow rate determination is made as follows. Using the piping system 80 shown in FIG. 12 as an example, the sources of the leaks in the pipe configuration are first located 90 by ultrasonic sound detector along the piping system to locate the leak sites by means of the "coarse to fine" method. This is done by setting the attenuation dial 32 (see FIG. 3a) on "10" and entering the room, floor, or other location designation where leaks are occurring. With the attenuation dial 32 set at level "10", which is the lowest attenuation, the sound detector 28 responds to any sound sources that emit sounds in the pre-set sound detector frequency range. In one embodiment of the invention, this pre-set frequency range is 20–100 KHz. At this setting, the sound detector 28 is capable of picking up virtually all ultrasonic waves in the vicinity. As the attenuation dial 32 is turned down (counterclockwise as viewed in FIG. 3a), the sound detector 28 becomes less sensitive and responds only to the stronger signals. Once the strongest leak signal has been identified, any competing ultrasonic sound waves are blocked out 91 by conventional means, such as by an enclosure or a shroud placed around the leak site at which the sound measurement is being taken, and then the point of the most intense ultrasonic signals for this strongest leak is located by moving the sound detector 28 completely around the leak site at the predetermined distance "A" from the leak source, in the manner illustrated in FIG. 2. This most intense ultrasonic emission point corresponds to the location where the highest sound pressure level is indicated on scale 30 of the ultrasonic sound detector. Preferably, unless the attenuation dial has been turned down, the sound detector 28 is not placed directly in the path of the discharging fluid so that the sound detector 28 is not damaged. In one embodiment of the invention, six inches is used as distance "A" although other distances can also be used, depending upon the leakage rates encountered. The distance "A" should correspond as closely as possible to the distance used in creating the database so as to obtain the most accurate results.

Once the most intense ultrasonic emission point is located, the attenuation dial 32 on the ultrasonic sound detector 28 is then turned to obtain an indicated sound pressure level at the midpoint 36 on the ultrasonic sound detector meter scale 30. The numerical position on the scale associated with the attenuation dial 32 at this point is the leak sensitivity value 92.

Assuming the leak sensitivity value obtained falls between the upper and lower limits of the sensitivity settings in the database 38 for the parameters 93 associated with the leak site, the sensitivity value obtained can be used to interpolate 94 on a straight-line basis, between the two surrounding sensitivity values contained in the previously determined database to permit determination of the corresponding equivalent cross-sectional area 95 for the leak site. In the preferred embodiment of the invention, a computer performs the interpolation and calculates and displays a leakage flow rate 96 for the tested conditions.

If the tested sensitivity value is above or below the database range for any fluid, the corresponding cross-sectional area can be linearly extrapolated from the data contained in the database.

In one embodiment of the invention, the obtained sensitivity value is compared to a standard curve comparing fluid leakage rates to sensitivity values to obtain the corresponding leakage rate. The standard curve may be in the form of a mathematical formula previously determined to represent the curvilinear relationship between empirically determined sensitivity and leak rate values for the given parameters. In this embodiment, a leak rate would be determined directly from the obtained sensitivity value. A computer may be employed to calculate and display a leakage flow rate for the tested conditions.

The use of a computer program permits the selection of a desired form for display 97 and printout of the data so as to present a simple, readily understandable summary of the leaks in the surveyed system and their cumulative effects, in terms of annual volume of fluid lost and in terms of yearly cost based upon the cost for the type of fluid within the system that is tested.

After all the data for the first leak have been recorded, its effect is blocked out by conventional means during the testing at the other leak sites. Since ultrasound will not travel through a solid object, blockage is easily accomplished. Once the strongest signal is blocked out, the next strongest signal can then be located by the "coarse to fine" method and its relevant data recorded as just described. The process continues until the entire piping system has been surveyed and all leaks have been documented.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for providing a database for use in determining the flow rate of a fluid at a leak site in a pressurized fluid system, said method comprising the steps of:
   a) deriving attenuation level values corresponding to sound pressure level values for fluid leaks from known piping elements of known fluids at known pressures, temperatures, and leakage flow rates;
   b) plotting the leakage flow rates versus the attenuation level values as points on a graph;
   c) estimating a standard curve based on the plotted points; and
   d) storing data corresponding to the standard curve for the corresponding system elements and fluid conditions to provide a database for use in determining leakage flow rates in actual piping systems from measured sound pressure levels.

2. The method of claim 1 wherein the step of estimating a standard curve includes using the method of least squares.

3. The method of claim 1 wherein the step of storing the data corresponding to the standard curve includes storing a formula and derived coefficients.

4. A method for determining the rate of fluid leakage from a leakage site in a pressurized fluid system, said method comprising the steps of:
   a) providing a database containing data corresponding to standard curves representing the relationship between leakage site flow rates and attenuation levels for known piping system elements containing known fluids at known pressures and temperatures, said attenuation levels corresponding to attenuated sound pressure levels;
   b) measuring the maximum sound pressure level at said leakage site;
   c) attenuating the measured sound pressure level to a predetermined level;
   d) measuring the attenuation level associated with step (c); and
   e) comparing the attenuation level measured in step (d) to the standard curve data in the database for the given system conditions to determine the fluid leakage rate.

5. An apparatus for determining the rate of fluid leakage from a leakage site in a pressurized fluid system, said apparatus comprising:
   a) a digital computer containing a database including data corresponding to standard curves representing the relationship between leakage site flow rates and attenuation levels for known piping system elements containing known fluids at known pressures and temperatures, said attenuation levels corresponding to attenuated sound pressure levels;
   b) a sound pressure level meter for detecting a leakage site in the fluid system based upon sound emanating from the leakage site and for measuring the maximum sound pressure level at the leakage site;
   c) input means for inputting a measured sound pressure attenuation value and corresponding piping system element information and fluid condition information;
   d) program means for calculating leakage flow rate at each leakage site based upon the measured sound pressure attenuation value at the leakage site; and
   e) display means for displaying the calculated leakage flow rate at each leakage site.

* * * * *

UNITED STATES PATENT AND TRADEMARK OFFICE
CERTIFICATE OF CORRECTION

PATENT NO. : 5,719,785
DATED : February 17, 1998
INVENTOR(S) : Larry R. Standifer It is certified that error appears in the above-indentified patent and that said Letters Patent is hereby corrected as shown below:

Terminal disclaimer notice, line 3, cancel "5,575,136", insert --5,535,136--

Signed and Sealed this

Nineteenth Day of May, 1998

Attest:

BRUCE LEHMAN

Attesting Officer

Commissioner of Patents and Trademarks